United States Patent Office 3,494,675
Patented Feb. 10, 1970

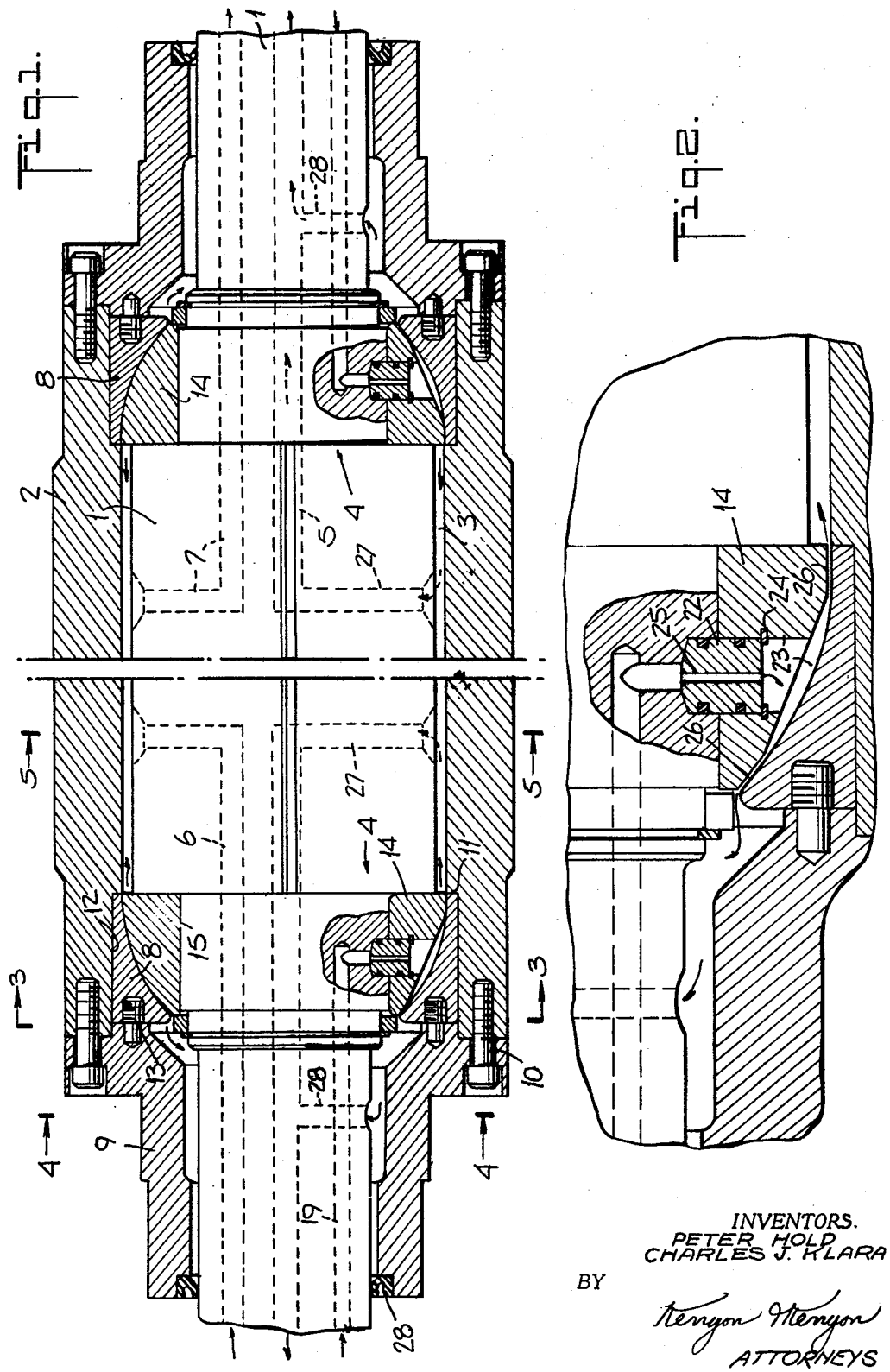
INVENTORS.
PETER HOLD
CHARLES J. KLARA
BY
Kenyon & Kenyon
ATTORNEYS

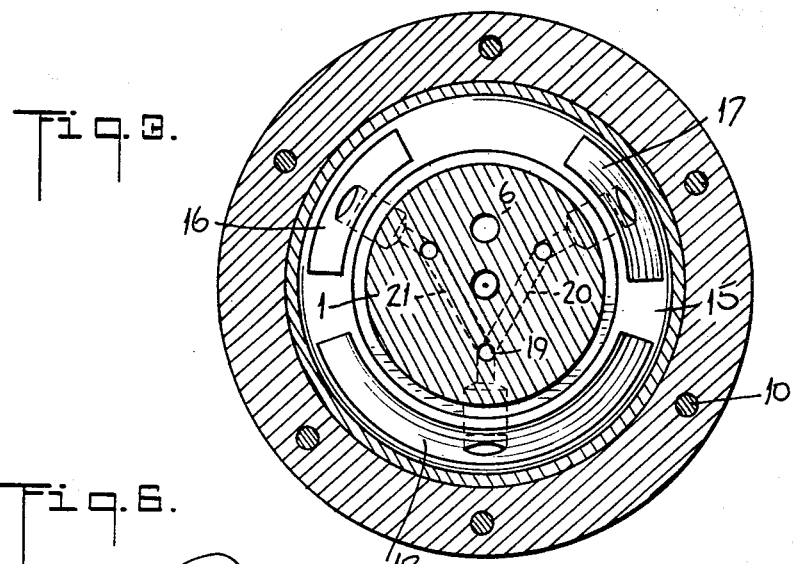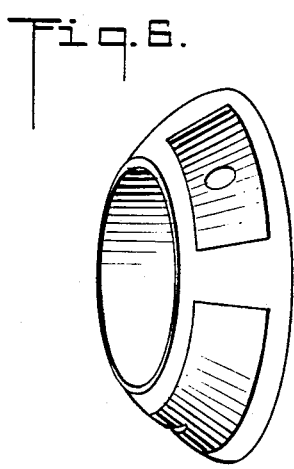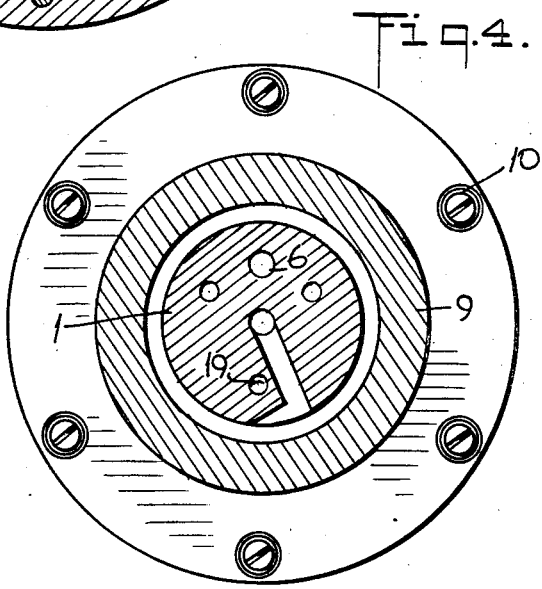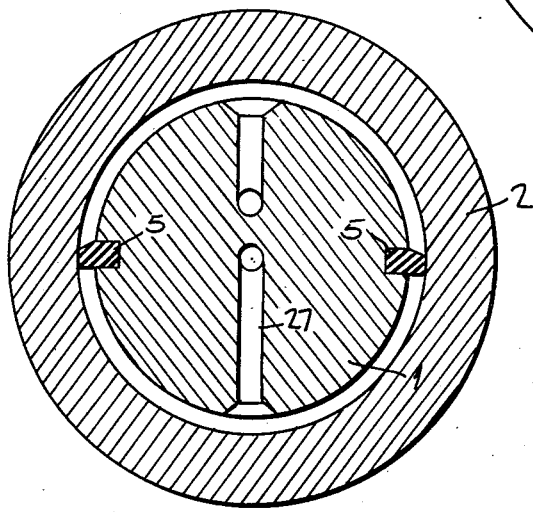

3,494,675
CONTROLLED DEFLECTION ROLL
Peter Hold, Milford, Conn., and Charles J. Klara,
Wyomissing, Pa., assignors to Farrel Corporation,
Ansonia, Conn., a corporation of Connecticut
Filed June 11, 1968, Ser. No. 736,086
Int. Cl. F16c 13/00, 35/00, 17/16
U.S. Cl. 308—20                                    6 Claims

ABSTRACT OF THE DISCLOSURE

A controlled deflection roll has its cylindrical shell roll rotatively journaled on its non-rotative shaft by self-aligning hydrostatic bearings.

---

This invention relates to controlled deflection rolls of the type having a non-rotative shaft on which a cylindrical shell roll is rotatively journaled by axially interspaced self-aligning bearings. The shell roll encircles the shaft with radial space between the rolls inside and the shaft and there are means between the interspaced bearings for applying pressure between one side of the shaft and the roll's inside in a direction controlling the deflection of the roll. With the ends of the shaft supported and the roll subjected to rolling pressure, the shaft deflects as a beam between its ends with the roll shell remaining either straight or over or under deflected, depending on the internal controlling pressure used.

It follows from the foregoing that there is relative angular movement between the shell roll and shaft which requires the use of the self-aligning bearings for journaling the roll on the shaft.

Conventionally, the self-aligning bearings are anti-friction roller bearings occupying substantial radial space. This prevents the outside diameter of the shell roll from being made as small as is sometimes desired for the work to be performed. Lateral dimensions of the shaft are fixed by the beam strength and stiffness it must provide.

Furthermore, the load-carrying ability and service life of anti-friction roller bearings are not as great as is desirable, this being particularly so if any effort is made to reduce the normal radial dimensions of such bearings.

On the other hand, hydrostatic bearings can be made more compact in radial directions, their inherent load-carrying ability being greater than anti-friction roller bearings. Their service life is also greater.

With the foregoing in mind and briefly summarized, the present invention is characterized by the previously referred to self-aligning bearings each comprising an internal spherical hydrostatic bearing runner connected to the inside of the rotative shell roll and facing axially inwardly with respect to the shell roll. A plurality of circumferentially interspaced hydrostatic bearing pads are connected to the shaft and these pads are shaped to conform to the spherical runner. Fluid supplied to these pads flows through restrictors and causes separation between the bearing elements. It follows that the shell roll is journaled on the shaft in a self-aligning manner while running on only fluid films. The fluid used would ordinarily have lubricating properties.

Controlled deflection rolls require supplying controlling pressure throughout the length of the roll shell. One way to do this is by using seals between the shaft and the inside of the shell roll which divides the radial space therebetween into two chambers, and to one of which fluid is introduced under pressure and produces the deflection control desired. Heretofore this has required the use of axially extending seals and also end seals, with these seals comprising elements separate from the bearings.

In addition the the diameter size reduction obtainable through the use of hydrostatic bearings of the spherical construction described hereinabove, there is the additional advantage that these bearings can function as end seals eliminating the need for separate end seal elements. Only the axial seals are required.

A specific example of the present invention is illustrated by the accompanying drawings in which:

FIG. 1 is a longitudinal section;
FIG. 2 is an enlargement taken from FIG. 1 to show more clearly details of the hydrostatic bearings at one end;
FIG. 3 is a cross-section taken on the line 3—3 in FIG. 1;
FIG. 4 is a cross-section taken on the line 4—4 in FIG. 1;
FIG. 5 is a cross-section taken on the line 5—5 in FIG. 1; and
FIG. 6 is a perspective view showing the manner in which the circumferentially interspaced hydrostatic bearing pads are provided.

Referring first to FIG. 1, there is shown the non-rotative shaft 1, the cylindrical shell roll 2 encircling the shaft 1 with radial space 3 between the roll shell inside diameter and the shaft, and the axially interspaced self-aligning bearings generally indicated by the numeral 4 journaling the shell roll 2 rotatively on the non-rotative shaft 1. The means between the bearings 4 used to aid in maintaining pressure between one side of the shaft 1 and the roll's inside to control the deflection of the roll 2, comprises the oppositely located axial seals 5 which divide the space 3 into upper and lower chambers. In this instance, pressure is provided in the upper chamber by fluid which is introduced to this upper chamber in the form of a flow under pressure. The fluid flows to this upper chamber through a passage 6 extending axially through the shaft 1 and upwardly to the chamber, the fluid flowing from this upper chamber by way of a passage 7 which extends downwardly and axially through to the other end of the shaft. By controlling the pressure on this fluid flow, the roll deflection controlling pressure is obtained.

Referring now particularly to the two bearings 4, each comprises an internal spherical hydrostatic bearing runner 8 connected to the inside of the rotative shell roll and facing axially inwardly with respect to this roll. The connection is established by the roll 2, at each end, having roll necks 9 provided with flanges which contact the end of the roll 2 and are secured to it by screws 10, the inner end of this neck contacting the outer end of the runner 8 and the latters' inner end being contacted against a shoulder 11 formed on the inside of the roll 2 by reason of the runner 8 being seated in a counter bore 12 in the end of the roll 2. Screw studs 13 extend between the runner 8 and the inner end of the neck 9 so that the runner is locked against rotation in the counter bore 12.

The plurality of circumferentially interspaced hydrostatic bearing pads connected to the shaft and shaped to conform to the runner 8, is provided by a collar 14 which surrounds a reduced portion 15 of the shaft 1 and having an external spherical surface conforming in shape to that of the internal runner 8. The pads are provided by three recesses 16, 17 and 18 of which the recess 18 is circumferentially the longest because it is opposite to the upper or high pressure chamber above the axial seals 5. Each recess is long circumferentially as compared to its width in an axial direction.

Fluid flows to the three recesses 16, 17 and 18 by way of a passage 19 which extends axially through the shaft from its ends to the three pads formed by the recesses 16, 17 and 18, branch lines 20 and 21 interconnecting all three pads of each bearing. Although not shown, separate passages could lead from the shaft's end to each of the three pads. Because they are interconnected, each pad is provided with its own individual hydrostatic fluid flow restrictor 22.

In more detail, each pad is fed through a radially inwardly extending bore 23 which also extends partly into the shaft's reduced portion 15. Each restrictor is in the form of a cylindrical block seated in this bore 23 where it is held by a retaining collar or ring 24, the block having an axial bore 25 providing the necessary flow restriction required by a hydrostatic bearing pad. The restrictors 22 are removable so that others having restricting bores 25 of differing cross-sectional area may be substituted as operating conditions require. Because the flow restrictors 22 extend into the shaft's reduced portion 15 they also act to lock or key the collar 14 to the shaft 1 to prevent rotation of this collar and therefore the series of circumferentially interspaced pads of the collar.

The inner spherical surface of each runner 8 terminates inwardly tangent to the inside of the cylindrical shell roll 2. In other words, the radius of the spherical surface where the latter joins the inside of the shell roll is the same as the radius of this inside.

In operation, it is to be understood that the ends of the shaft 1 are supported in the unillustrated frames of the machine or mill using the roll and that these frames would ordinarily mount a roll cooperating with the outside of the shell roll 2 to form a pressure rolling nip or pass. Alternately, the necks 9 may be journaled in the frames, in which event self-aligning bearings would be interposed between the shaft's ends and the insides of the roll necks so that the shaft's ends are supported by the frames through these bearings and the journaled roll necks. Such arrangements are used conventionally today and need not be illustrated.

Fluid under pressure is passed through the passages 19 so that it flows through the hydrostatic bearing flow restrictors 22 to the pads 16, 17 and 18. The fluid pressure builds up in each of the pads to form fluid films or pools so that there is no metal to metal contact. The fluid flows outwardly from each pad through the spaces or clearances 26 between the pads and runners.

With an increase in rolling pressure, the shell roll 2 would deflect as a beam were it not for the fact that the fluid flowing through the upper chamber established by way of the passages 6 and 7, provides a uniform supporting pressure on the inside of the shell roll 2. The shaft 1 then flexes as a beam because it is carrying the load. The self-aligning nature of the bearings 4 accommodates the incidental angular deflections of the shaft.

Furthermore, as the shaft 1 is loaded, the spaces 26 decrease so as to restrain the fluid flowing through them from the bearing pads. This causes the fluid pressure in the films or pools of the pads to increase so that spaces 26 increase. When they increase the fluid can flow more freely and because of the restrictors 22, the flow rate to the pads is choked or restricted with the result that the fluid pressure in the pads drops. Because of this characteristic action, the roll 2 is literally journaled without any metal to metal contact.

It follows from the above that the load-carrying ability and the service life of a roll using the present invention is greater than when anti-friction roller bearings of comparable size are used, and obviously the roll diameter may be decreased because of the compactness of the hydrostatic bearings.

The fluid flowing inwardly to the lower chamber due to leakage passed the seals 5 from the upper chamber, is removed by way of a passage 27 which extends radially and then longitudinally through the non-rotative shaft 1. The fluid flow axially outwardly from the pads is confined within the necks 9 because of end seals 28 between the shaft and the ends of the necks 9. This fluid is removed by way of radial passages 28 formed in the shaft 1 and connecting with the axially extending portions of the passages 27.

Now, of greater interest, the fluid flows from the pads axially inwardly around the entire periphery of each bearing so the fluid also flows into the upper chamber which must confine the fluid under the pressure required for controlling the deflection of the shell roll 2. Furthermore, the fluid flows from the bearing pads are under a substantially greater pressure than the fluid pressure in the upper chamber although the volume of this flow is substantially less than the volume of the flow of fluid fed through the passages 6 and 7 to establish the fluid pressure for deflection control. Consequently, the hydrostatic bearings function to prevent loss of fluid pressure from the upper chamber and thus eliminate the need for the prior art end seals, but without interfering with the desired roll deflection control.

It is to be understood that theoretically the fluid pressure for controlling roll deduction could be static. However, it is more complicated to control the pressure by a flow of fluid through the upper chamber, the pressure of this fluid flow then being controlled to control the roll deflection. The small amount of fluid introduced from the hydrostatic bearing pads does not interfere with the pressure control of the flow established through the passages 6 and 7 for deflection control. At the same time, the higher pressure of the flows from the hydrostatic bearings, seal the ends of the upper chamber completely against leakage with respect to the deflection controlling fluid flow.

The combination of the hydrostatic bearings and the direct application of deflection controlling fluid pressure result in a controlled deflection roll of small diameter than has heretofore been possible while having greater load-carrying ability and a greater service life.

What is claimed is:

1. A controlled deflection roll comprising a non-rotative shaft, a cylindrical shell roll encircling said shaft with radial space between the roll's inside and the shaft, interspaced self-aligning bearings journaling said shell roll rotatively on said shaft and means between said bearings for applying pressure between one side of said shaft and said roll's inside to control the deflection of the roll; characterized by said bearings each comprising an internal spherical hydrostatic bearing runner connected to the inside of said rotative shell roll and facing axially inwardly with respect to the roll, a plurality of circumferentially interspaced hydrostatic bearing pads connected to said shaft and shaped to conform to said runner, and means including hydrostatic bearing flow restrictor means for supplying said pads with flows of fluid.

2. The roll of claim 1 in which as to each of said bearings a collar surrounds said shaft and has an external spherical surface conforming to said internal runner and in which surface cavities are formed to provide said pads, said flows of liquid leaving said cavities flowing between said surface and said runner, said pressure applying means comprising circumferentially spaced axial seals extending along said shaft from one of said bearings to the other with said bearings forming end seals dividing said radial space into a plurality of chambers, and means for introducing fluid under pressure to one of said chambers.

3. The roll of claim 1 in which said flow supplying means is at least in part formed by passages extending through said non-rotative shaft from one or both of its outer end portions to said pads.

4. The roll of claim 1 in which said spherical runner at its inner end is substantially tangent to said roll's inside.

5. The roll of claim 2 in which said flow supply means is at least in part formed by passages extending through said non-rotative shaft from one or both of its outer end portions and which at each of said collars extends thereto, the collars having passages registering with said shaft's passages and extending to said cavities.

6. The roll of claim 2 in which said means for introducing fluid under pressure to said one chamber includes both an inlet and outlet means so that said fluid may flow to and from and through said one chamber, whereby said liquid flows leaving said cavities in directions towards said one chamber joins said fluid flow through this chamber.

References Cited

UNITED STATES PATENTS 2,919,960  1/1960  Whitney _____ 308—122

MARTIN P. SCHWADRON, Primary Examiner

FRANK SUSKO, Assistant Examiner

U.S. Cl. X.R.

308—9, 93